United States Patent
Van Ginderen

(10) Patent No.: US 12,337,577 B2
(45) Date of Patent: Jun. 24, 2025

(54) COMPOSITION OF AN ADHESIVE BARRIER LAYER BETWEEN A NON-WOVEN MATERIAL AND ANOTHER NON-WOVEN MATERIAL FOR PROCESSING AT HIGHER TEMPERATURES

(71) Applicant: WALKI BELCOAT, naamloze vennootschap, Duffel (BE)

(72) Inventor: Peter Jozef Van Ginderen, Aartselaar (BE)

(73) Assignee: WALKI BELCOAT, naamloze vennootschap, Duffel (BE)

( * ) Notice: Subject to any disclaimer, the term of this patent is extended or adjusted under 35 U.S.C. 154(b) by 355 days.

(21) Appl. No.: 17/775,018

(22) PCT Filed: Nov. 6, 2020

(86) PCT No.: PCT/IB2020/060463
§ 371 (c)(1),
(2) Date: May 6, 2022

(87) PCT Pub. No.: WO2021/090260
PCT Pub. Date: May 14, 2021

(65) Prior Publication Data
US 2022/0396058 A1    Dec. 15, 2022

(30) Foreign Application Priority Data

Nov. 7, 2019    (BE) .................................... 2019/5771

(51) Int. Cl.
*B32B 27/08*    (2006.01)
*B32B 3/26*    (2006.01)
(Continued)

(52) U.S. Cl.
CPC .............. *B32B 27/08* (2013.01); *B32B 3/266* (2013.01); *B32B 5/022* (2013.01); *B32B 27/12* (2013.01);
(Continued)

(58) Field of Classification Search
CPC ......... B32B 27/08; B32B 3/266; B32B 5/022; B32B 27/306; B32B 27/34;
(Continued)

(56) References Cited

U.S. PATENT DOCUMENTS

2007/0012512 A1* 1/2007 Fusiki .................. G10K 11/168
181/290
2008/0223654 A1* 9/2008 Juriga ...................... B32B 5/26
428/221
(Continued)

FOREIGN PATENT DOCUMENTS

WO    2011019478 A1    2/2011
WO    2018170115 A1    9/2018

OTHER PUBLICATIONS

Schaschke, Carl. (2014). Dictionary of Chemical Engineering—composition. (pp. 73-74). Oxford University Press. Retrieved from https://app.knovel.com/hotlink/pdf/id:kt00TW5AE9/dictionary-chemical-engineering/composition (Year: 2014).*
(Continued)

*Primary Examiner* — John D Freeman
(74) *Attorney, Agent, or Firm* — Dinsmore & Shohl LLP

(57) ABSTRACT

A composition of an adhesive water-tight and steam-tight barrier layer that includes an acoustically insulating polyamide layer which along one side is provided with: a first water-tight and steam-tight polyethylene-layer with 0-25 weight % ethylene vinyl acetate and with a melting point between 70° C. and 110° C.; and along the opposite side is provided with an optional second water-tight and steam-
(Continued)

tight and pure polyethylene layer. A third water-tight and steam-tight polyethylene/ethylene vinyl acetate copolymer layer with 15-25 weight % ethylene vinyl acetate and with a melting point between 70° C. and 95° C. bordering the second and pure polyethylene layer or, when the latter is missing, the acoustically insulating polyamide layer itself.

12 Claims, 2 Drawing Sheets

(51) Int. Cl.
  *B32B 5/02*  (2006.01)
  *B32B 27/12* (2006.01)
  *B32B 27/30* (2006.01)
  *B32B 27/32* (2006.01)
  *B32B 27/34* (2006.01)

(52) U.S. Cl.
  CPC ............ *B32B 27/306* (2013.01); *B32B 27/32* (2013.01); *B32B 27/34* (2013.01); *B32B 2250/04* (2013.01); *B32B 2250/24* (2013.01); *B32B 2307/102* (2013.01); *B32B 2307/7246* (2013.01); *B32B 2307/7265* (2013.01); *B32B 2605/003* (2013.01)

(58) Field of Classification Search
  CPC ............ B32B 2250/04; B32B 2250/24; B32B 2307/102; B32B 2307/712; B32B 2307/7246; B32B 2307/7265; B32B 2323/04; B32B 2331/04; B32B 2367/00; B32B 2307/7242; B32B 2471/02; B32B 2605/003; B32B 27/12; B32B 27/32
  See application file for complete search history.

(56) References Cited

U.S. PATENT DOCUMENTS

| | | | |
|---|---|---|---|
| 2013/0153330 A1* | 6/2013 | Fushiki | B32B 5/22 181/290 |
| 2014/0371698 A1* | 12/2014 | Chang | B32B 27/08 181/294 |
| 2015/0118437 A1 | 4/2015 | Schulze et al. | |
| 2015/0224750 A1* | 8/2015 | Visioli | B32B 27/308 156/60 |
| 2017/0042722 A1* | 2/2017 | Chang | B32B 7/12 |
| 2019/0061311 A1* | 2/2019 | Schulze | B32B 5/022 |

OTHER PUBLICATIONS

International Search Report & Written Opinion to corresponding PCT Application No. PCT/IB2020/060463 dated Jan. 29, 2021.

* cited by examiner

COMPOSITION OF AN ADHESIVE BARRIER LAYER BETWEEN A NON-WOVEN MATERIAL AND ANOTHER NON-WOVEN MATERIAL FOR PROCESSING AT HIGHER TEMPERATURES

CROSS-REFERENCE TO RELATED APPLICATIONS

The present application is the National Phase entry of International Patent Application No. PCT/IB2020/060463 filed Nov. 6, 2020, which claims priority to Belgium Patent Application No. 2019/5771 filed Nov. 7, 2019, the entire contents of both are hereby incorporated by reference into this application.

TECHNICAL FIELD

The present disclosure relates to a composition of an adhesive barrier layer between a non-woven material and another non-woven material for processing at higher temperatures.

In particular, the present disclosure is intended for binding several layers of non-woven material under the influence of steam and pressure whereby a water-tight and steam-tight barrier layer is formed between the layers of non-woven material.

BACKGROUND

It is known that non-woven material can be used for a lining instead of a woven carpet. The application of non-woven material as interior lining for vehicles, whereby the non-woven material is applied as a non-flat lining against the roof or the floor of the vehicle is already known.

Traditionally the non-woven material is moulded into the desired form under the influence of pressure and/or temperature, such that it can be fittingly mounted in a particular vehicle. It is known that a heating process with steam can be used for this (e.g. US2015/0118437).

WO 2018/170115 A1 describes a laminate of two non-woven materials between which one polymer sheet of a polymer such as polyethylene, polyamide, or another thermoplastic polymer is located. The laminate is used as interior lining for a vehicle.

WO 2011/019478 A1 describes a laminate for protective apparel, with a non-woven layer, to which a breathable layer is bound consisting of a first and second microporous film between which a monolithic layer of copolyether ester, copolyether amide or urethane polymer is located. The laminate is used as protective apparel in hospitals.

There is a problem when several and different layers of a non-woven material need to be bound to each other and moulded in the desired form, whereby the different layers of non-woven material have to remain firmly bound to each other everywhere while in addition a water- and steam-tight barrier has to be formed between both layers to limit the penetration of steam up to this steam-tight barrier, such that the non-woven material on the opposite side of the steam-tight barrier cannot be thermally degraded by the presence of steam.

SUMMARY

The purpose of the present disclosure is to offer a solution to said requirements by providing in a multi-layer adhesive water-tight and steam-tight barrier layer with which two different non-woven materials can be and remain bound to each other, also after a thermal and/or pressure treatment with steam to give a desired form to the layer package, and this without thermal degradation of the non-woven material that faces the interior of the vehicle and therefore the passengers.

To this end, the present disclosure relates to a composition of an adhesive water-tight and steam-tight barrier layer, consisting of an acoustically insulating polyamide layer which along one side is provided with:
 a first water- and steam-tight polymer layer or copolymer layer composed of
  a polyethylene layer or, abbreviated, a PE layer, being LDPE or HDPE, or
  a copolymer layer composed of
   ethylene/vinyl acetate (22.5 weight %), or
   ethylene/1-octene, or
   ethylene/1-hexene, or
   ethylene/1-propene; or
  a polypropylene layer, or abbreviated, a PP layer,
 said first water-tight and steam-tight polymer layer or copolymer layer being characterised by a melting point between 75° C. and 165° C.;
and said acoustically insulating polyamide layer being provided along the opposite side with
 an optional second water-tight and steam-tight polymer layer,
 a third water-tight and steam-tight polymer layer composed of either
  PE, being LDPE or HDPE, possibly copolymerised with 0-25 weight % vinyl acetate to polyethylene vinyl acetate with a melting point between 70° C. and 95° C., or
  ethylene, copolymerised with 1-octene, or with 1-hexene, or with 1-propene, with a melting point between 70° C. and 95° C.,
bordering the second polyethylene layer or, if the latter is missing, bordering the acoustically insulating polyamide layer.

An aspect of the above layer structure is that the central acoustically insulating polyamide layer is flanked on both sides with a water-tight and steam-tight polymer layer or copolymer layer, a first layer on the side facing the car passengers with a melting point between 75° C. and 165° C., and a second layer on the side facing the car bodywork with a lower melting point between 70° C. and 95° C.

The production process for forming a ready-made vehicle carpet lining in one step, whereby two non-woven materials are bound together by an intermediate barrier layer according to the present disclosure, is done in a mould, while heat is supplied in the form of steam from under the thermoformable non-woven material facing the bodywork, after which the heat penetrates up to the first side of the polyamide layer facing the passengers.

A problem observed is that if during the heating process steam penetrates the non-woven material facing the passengers, i.e. the carpet layer on which passengers sit, said carpet layer is unacceptably degraded by the combination of moisture and heat.

However, because of the layer structure according to the present disclosure, the supplied steam will now first hit the second polymer layer or copolymer layer which melts at a lower temperature, and thus forming a water- and steam-tight barrier, which prevents steam penetrating into the carpet layer, but allows the first polymer layer or copolymer layer to be heated to its melting point in a dry way, such that both non-woven materials are firmly bound to the acoustically insulating polyamide layer, but without thermal degradation of the carpet layer for the passengers.

In an embodiment of the adhesive water-tight and steam-tight barrier layer
the first water-tight and steam-tight polymer layer or copolymer layer consists of polyethylene, possibly copolymerised with 0-25 weight % ethylene vinyl acetate with a melting point between 70° C. and 110° C.; along the opposite side provided with
an optional second water-tight and steam-tight polyethylene layer,
the third water-tight and steam-tight polymer layer consists of polyethylene copolymerised with 15-25 weight % ethylene vinyl acetate with a melting point between 70° C. and 95° C. bordering the second polyethylene layer or, if the latter is missing, bordering the acoustically insulating polyamide layer itself.

In yet another embodiment of the present disclosure, the water-tight and steam-tight barrier layer consists of an acoustically insulating polyamide layer which along one side is provided with:
a first water-tight and steam-tight polymer layer or copolymer layer of polyethylene copolymerised with 5 weight % ethylene vinyl acetate and with a melting point of 109° C.; and along the opposite side is provided with:
an optional second water-tight and steam-tight pure polyethylene layer, which in turn borders:
a third water-tight and steam-tight polymer layer of polyethylene copolymerised with 22.5 weight % ethylene vinyl acetate and with a melting point of 73° C. bordering the second water-tight and steam-tight and pure polyethylene layer or, if this is missing, bordering the acoustically insulating polyamide layer itself.

An aspect of such adhesive barrier layer is that the polyethylene layer with a melting point of 109° C. can fuse with a polyethylene-terephthalate back layer of a first non-woven material such that an adhesion with the first non-woven material can be created.

In some embodiments, the back layer of polyethylene-terephthalate of the first non-woven material is perforated by a treatment with needles, such that the adjoining first polyethylene layer with a melting point of 109° C. can penetrate it.

Another aspect of such adhesive barrier layer is that the second and pure polyethylene layer on the opposite side of the polyamide layer prevents tearing of the polyamide barrier layer in case of mechanical deformation.

An aspect of such an adhesive barrier layer is that the third polyethylene layer with a melting point of 73° C. can fuse with a second non-woven material which is thermoformable and in turn consists of
an insulation layer of PET/coPET fibres.

All this ensures that the first non-woven material which is in contact with the passengers of the vehicle is separated by an adhesive water-tight and steam-tight barrier layer from the second non-woven material which is in contact with the bodywork of the vehicle.

The acoustically insulating barrier layer also ensures a sound insulating effect for the passengers and a permanent watertight seal between the two non-woven materials.

In some embodiments, the acoustically insulating polyamide barrier layer is provided along one side with a tie layer consisting of a terpolymer of ethylene, butylacrylate and maleic anhydride with a melting point of 91° C. for tying the first water-tight and steam-tight polyethylene/ ethylene vinyl acetate copolymer layer with 5 weight % ethylene vinyl acetate and with a melting point of 109° C. and the acoustically insulating polyamide barrier layer is provided along the opposite side with a similar tie layer with an adjusted melting point for tying the second water-tight and steam-tight and pure polyethylene layer, or the third polyethylene/ethylene vinyl acetate copolymer layer with 22.5 weight % ethylene vinyl acetate and with a melting point of 73° C.

The adhesive water-tight and steam-tight barrier layer allows the properties of the first non-woven material to be optimally aligned with passenger comfort, in terms of thickness, comfort and look of the carpeting with which the passenger comes into contact, and the properties of the second non-woven material to be optimally aligned with its function as basis of the floor lining which comes into contact with the bodywork and must be fittingly mounted to the form of the bodywork.

BRIEF DESCRIPTION OF THE DRAWINGS

With the intention of better showing the characteristics of the present disclosure, an embodiment of an adhesive water and steam-tight barrier layer is described hereinafter, by way of an example without any limiting nature, with reference to the accompanying drawings wherein.

DETAILED DESCRIPTION

Figure 1:
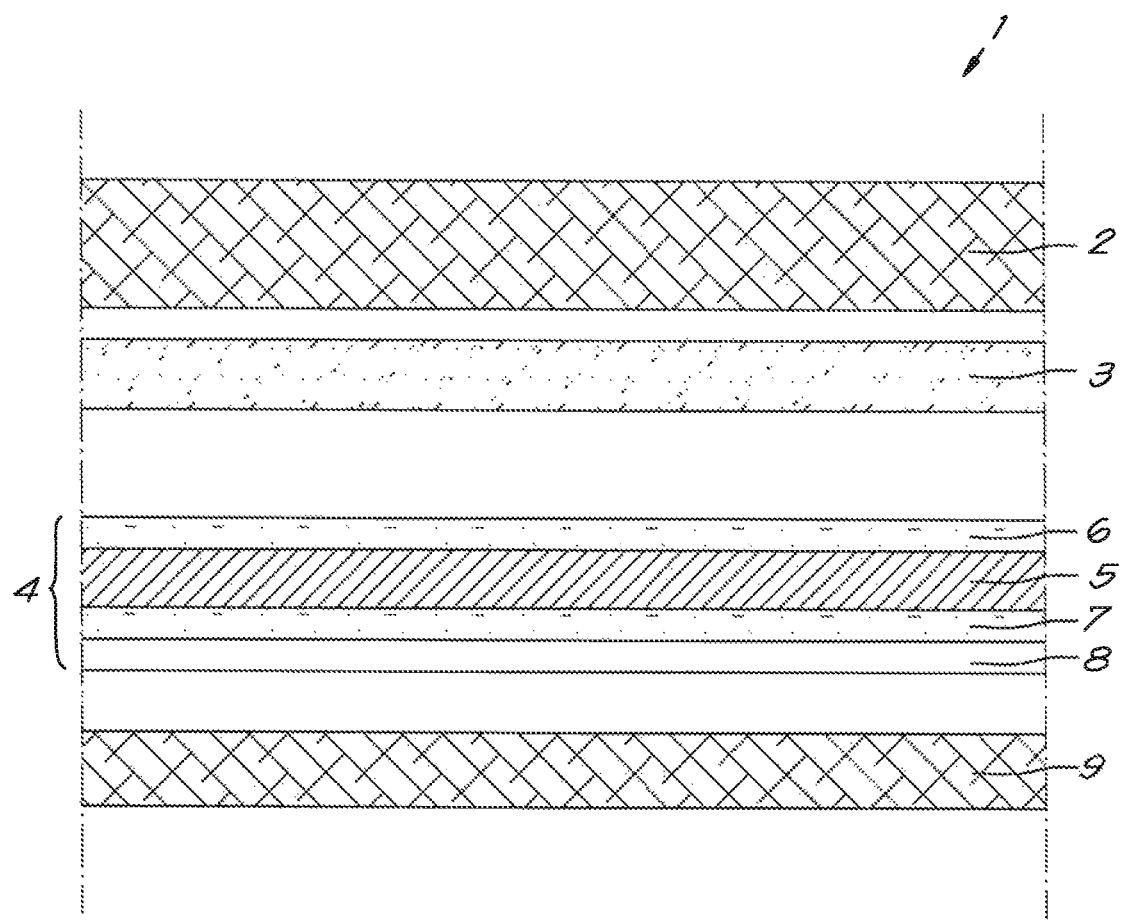
FIG. 1 schematically and in cross-section shows a layer package with an adhesive water-tight and steam-tight barrier layer according to the present disclosure.

FIG. 1 schematically shows a cross-section, perpendicular to the surface of a layer package 1 with an adhesive water- and steam-tight barrier layer according to the present disclosure, whereby the layer package consists of a first non-woven material 2, a back layer 3 of polyethylene-terephthalate for the first non-woven material 2, and an adhesive water-tight and steam-tight barrier layer 4 according to the present disclosure under it, consisting of an acoustically insulating barrier layer of polyamide 5 with a first polyethylene/ethylene vinyl acetate copolymer layer 6 with five weight % ethylene vinyl acetate and with a melting point of 109° C. along the upperside of the polyamide layer 5 and along the underside provided with a second and pure polyethylene layer 7, which in turn borders a third polyethylene/ ethylene vinyl acetate copolymer layer 8 with 22.5 weight % ethylene vinyl acetate and with a melting point of 73° C. A second non-woven material 9 which is thermoformable is located under the third polyethylene layer 8.

Figure 2:
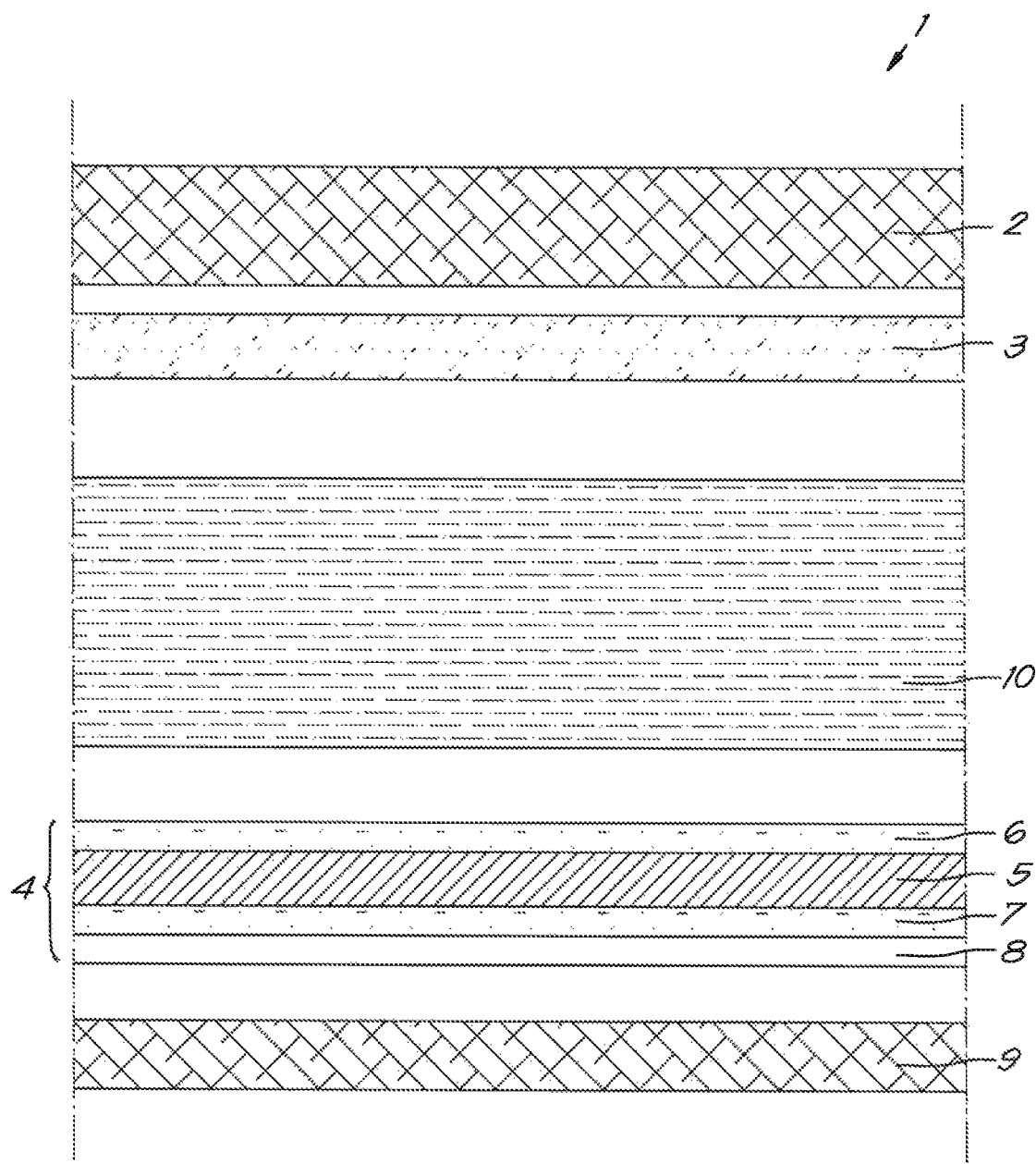
FIG. 2 shows a variant of FIG. 1.

FIG. 2 shows a variant of FIG. 1, whereby in this case an insulating bitumen layer 10 is applied between the back layer 3 according to the present disclosure and the first polyethylene/ethylene vinyl acetate copolymer layer 6 with five weight % ethylene vinyl acetate. The aim of the bitumen layer 10 is to obtain a better sound insulation in certain sensitive points of the surface of the layer package 1 and is only applied in such sensitive points.

The operation of the adhesive water-tight and steam-tight barrier layer 4 according to the present disclosure is very simple and as follows.

The barrier layer 4 was produced in advance by coextrusion, whereby the acoustically insulating polyamide layer 5 is already firmly bound to the first polyethylene layer 6 on its upperside and to the second and pure polyethylene layer 7 on its underside, which is also already fused with the third polyethylene layer 8 by coextrusion.

During the thermal and pressure treatment with steam of the layer package 1, the back layer 3 of polyethyleneterephthalate of the first non-woven material 2 will fuse with the first polyethylene/ethylene vinyl acetate copolymer layer 6 with five weight % ethylene vinyl acetate and with a melting point of 109° C. which is located along the upperside of the watertight polyamide layer 5. Thanks to this fusing, the first non-woven material 2 is firmly bound to the acoustically insulating polyamide layer 5.

At the same time the third polyethylene/ethylene vinyl acetate copolymer layer 8 with 22.5 weight % ethylene vinyl acetate and with a melting point of 73° C. will fuse with the second non-woven material 9 in which the melted layer 8 partially penetrates. Due to this fusing, the second non-woven material 9 is also firmly bound to the acoustically insulating polyamide layer 5.

The adhesive water-tight and steam-tight barrier layer 4 hereby ensures a firm and moreover water-tight and steam-tight adhesion between an upper and a bottom non-woven material under the influence of temperature and pressure, whereby the used steam cannot penetrate through the water-tight and steam-tight barrier layer thus preventing thermal degradation of the first non-woven material 2 which comes into contact with the passengers in a vehicle for example.

The second and pure polyethylene layer 7 is optional and protects the layer package 1 against tears in case of excessive pressure loads, but can also be omitted for a number of applications.

The use of a bitumen layer 10 in the layer package 1 is also optional and typically is restricted to certain points of the layer package 1 which require a higher acoustic insulation.

In some embodiments, the total thickness of the adhesive water-tight and steam-tight barrier layer 4 itself varies between 40 micrometers and 250 micrometers. The thickness of a first non-woven material 2 and a second but different non-woven material 9 which are bound together by the adhesive barrier layer 4, varies strongly with the possible applications and can fall within a large range of thicknesses whereby the weight in g/cm² can vary from a few tens to a couple of thousands of g/cm².

The present disclosure is not limited to the embodiments described as an example and shown in the figures, but an adhesive water-tight and steam-tight barrier layer according to the present disclosure can be realised in all kinds of forms and dimensions without departing from the scope of the present disclosure, as is described in the following claims.

The invention claimed is:

1. A composition of an adhesive water-tight and steam-tight barrier layer, the composition consisting of:
    an acoustically insulating polyamide layer which along one side is provided with a first water-tight and steam-tight polymer layer or copolymer layer having a melting point between 75° C. and 165° C.;
    the acoustically insulating polyamide layer being provided along the opposite side with:
        an optional second water-tight and steam-tight polymer layer,
        a third water-tight and steam-tight polymer layer with a melting point between 70° C. and 95° C., adjacent to the optional second water-tight and steam-tight polymer layer or,
    when the latter is missing, adjacent to the acoustically insulating polyamide layer,
    wherein the melting point of the third water-tight and steam-tight polymer layer is lower than the melting point of the first water-tight and steam-tight polymer layer or copolymer layer.

2. The composition of the adhesive water-tight and steam-tight barrier layer according to claim 1, wherein the first water-tight and steam-tight polymer layer or copolymer layer is composed of:
    a polyethylene layer, or
    a copolymer layer composed of:
        ethylene/vinyl acetate,
        ethylene/1-octene,
        ethylene/1-hexene, or
        ethylene/1-propene; or
    a polypropylene layer,
    wherein the third water-tight and steam-tight polymer layer is composed of either:
        polyethylene,
        polyethylene copolymerised with 0-25 weight % vinyl acetate to polyethylene vinyl acetate, or
        ethylene, copolymerised with 1-octene, or with 1-hexene, or with 1-propene.

3. The composition of the adhesive water-tight and steam-tight barrier layer according to claim 2, wherein the first water-tight and steam-tight polymer layer or copolymer layer is composed of polyethylene copolymerised with 0-25 weight % vinyl acetate and has a melting point between 75° C. and 110° C.; and
    wherein the optional second water-tight and steam-tight layer is composed of a polyethylene layer,
    wherein the third water-tight and steam-tight polymer layer is composed of polyethylene copolymerised with 15-25 weight % vinyl acetate with a melting point between 70° C. and 95° C.

4. The composition of the adhesive water-tight and steam-tight barrier layer according to claim 3, wherein the first water-tight and steam-tight polymer layer or copolymer layer is composed of polyethylene copolymerised with 5 weight % vinyl acetate and with a melting point of 109° C.; and
    wherein the third water-tight and steam-tight polymer layer is composed of polyethylene copolymerised with 22.5 weight % vinyl acetate with a melting point of 73° C.

5. The composition of the adhesive water-tight and steam-tight barrier layer according to claim 4, wherein a total thickness of the adhesive water-tight and steam-tight barrier layer is between 40 micrometers and 250 micrometers.

6. A layer package consisting of:
    a first non-woven material;
    a second non-woven material different from the first non-woven material, the second non-woven material is thermoformable; and
    an adhesive water-tight and steam-tight barrier layer consisting of an acoustically insulating polyamide layer which along one side is provided with a first water-tight and steam-tight polymer layer or copolymer layer having a melting point between 75° C. and 165° C., the acoustically insulating polyamide layer being provided along the opposite side with an optional second water-tight and steam-tight polymer layer, and a third water-tight and steam-tight polymer layer with a melting point between 70° C. and 95° C., adjacent to the optional second adhesive water-tight and steam-tight polymer layer or, when the latter is missing, adjacent to the acoustically insulating polyamide layer, wherein the adhesive water-tight and steam-tight barrier layer is positioned between the first non-woven material and the second non-woven material, and wherein the melting point of the third water-tight and steam-tight polymer layer is lower than the melting point of the first water-tight and steam-tight polymer layer or copolymer layer.

7. The layer package according to claim 6, wherein the first non-woven layer includes a back layer of polyethylene-terephthalate, wherein the first water-tight and steam-tight polymer layer or copolymer layer is composed of polyethylene with 5 weight % vinyl acetate and with a melting point of 109° C., and wherein the third water-tight and steam-tight polymer layer is composed of polyethylene polymerised with 22.5 weight % vinyl acetate with a melting point of 73° C.

8. The layer package according to claim 6, wherein the acoustically insulating polyamide layer, the first water-tight and steam-tight polymer layer or copolymer layer, the optional second water-tight and steam-tight polymer layer, and the third water-tight and steam-tight polymer layer are positioned between the first non-woven material and the second non-woven material, wherein the first non-woven layer includes a back layer of polyethylene-terephthalate, wherein the first water-tight and steam-tight polymer layer or copolymer layer is composed of polyethylene with 5 weight % vinyl acetate and with a melting point of 109° C., and wherein the third water-tight and steam-tight polymer layer is composed of polyethylene polymerised with 22.5 weight % vinyl acetate with a melting point of 73° C.

9. The layer package according to claim 6, wherein the first non-woven material and the second non-woven material are bound to the adhesive water-tight and steam-tight barrier layer and molded in a desired form under influence of steam and pressure wherein steam is applied to a side of the second non-woven material.

10. The layer package according to claim 6, wherein the optional second water-tight and steam-tight polymer layer is composed of a polyethylene layer.

11. The layer package according to claim 8, wherein the second non-woven material which is thermoformable and consists of an insulation layer of PET/coPET fibres.

12. The layer package according to claim 8, for use in a vehicle, wherein the first non-woven material is in contact with passengers of the vehicle, and is separated by the adhesive water-tight and steam-tight barrier layer from the second non-woven material which is in contact with a bodywork of the vehicle.

* * * * *